(12) United States Patent
Uhrenholt

(10) Patent No.: US 10,997,756 B2
(45) Date of Patent: May 4, 2021

(54) PROCESSING OF PRIMITIVES IN A GRAPHICS PROCESSOR

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/659,357

(22) Filed: Oct. 21, 2019

(65) Prior Publication Data

US 2020/0134894 A1  Apr. 30, 2020

(30) Foreign Application Priority Data

Oct. 29, 2018 (GB) ...................................... 1817638

(51) Int. Cl.
*G06T 11/40* (2006.01)
*G06T 1/20* (2006.01)
*G06T 1/60* (2006.01)

(52) U.S. Cl.
CPC ................ *G06T 11/40* (2013.01); *G06T 1/20* (2013.01); *G06T 1/60* (2013.01)

(58) Field of Classification Search
CPC .............. G06T 11/40; G06T 1/20; G06T 1/60
USPC ....................................................... 345/619
See application file for complete search history.

(56) References Cited

U.S. PATENT DOCUMENTS

| 7,307,628 | B1 | 12/2007 | Goodman |
| 2003/0043148 | A1 | 3/2003 | Mei |
| 2013/0141445 | A1* | 6/2013 | Engh-halstvedt ..... G06T 15/503 345/506 |
| 2014/0375637 | A1* | 12/2014 | Heggelund ............. G06T 15/30 345/421 |
| 2016/0260249 | A1* | 9/2016 | Persson ................... G06T 11/40 |

FOREIGN PATENT DOCUMENTS

| GB | 2460752 | 12/2009 |
| GB | 2514465 | 11/2014 |

OTHER PUBLICATIONS

GB Combined Search and Examination Report dated Apr. 30, 2019, GB Patent Application No. 1817638.8.

* cited by examiner

*Primary Examiner* — Hai Tao Sun
(74) *Attorney, Agent, or Firm* — Vierra Magen Marcus LLP

(57) ABSTRACT

When processing a primitive when generating a render output in a graphics processor, the vertices for the primitive are loaded by a vertex loader, but before a primitive setup stage generates per-primitive data for the primitive using the loaded vertices for the primitive, an early culling test is performed for the primitive using data of the loaded vertices for the primitive. When the primitive passes the early culling test, the primitive is sent onwards to the primitive setup stage and to a rasteriser for rasterising the primitive, but when the primitive fails the early culling test, it is discarded from further processing at the early culling test.

14 Claims, 3 Drawing Sheets

PROCESSING OF PRIMITIVES IN A GRAPHICS PROCESSOR

BACKGROUND

The technology described herein relates to computer graphics processing, and in particular to the processing of graphics primitives when generating a rendering output on a graphics processor.

Graphics processing is normally carried out by first splitting the desired render output, such as a frame (image) to be displayed, into a number of similar basic components or "primitives", which primitives are then subjected to the desired graphics processing operation. The graphics primitives are usually in the form of simple polygons, such as lines, triangles or quadrilaterals.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processor in order, e.g., to render the desired render output, e.g. frame. This process basically involves determining which sampling positions of an array of sampling positions covering the output area to be processed are covered by a primitive, and then determining the appearance that each sampling point should have (e.g. in terms of colour, etc.) to represent the primitive at that sampling position. These processes are commonly referred to as rasterising and rendering, respectively.

The rasterising process typically determines the sampling points that should be used for a primitive (i.e., the (x, y) sampling positions for sampling points to be used to represent the primitive in the render output, e.g. frame to be displayed).

The rendering process then derives the data, such as red, green and blue (RGB) colour values and an "alpha" (transparency) value, necessary to represent the primitive at the sampling positions (i.e. "shades" each sampling point). This can involve applying textures, and blending sampling point data values, etc.

In graphics literature, the term "rasterisation" is sometimes used to mean both primitive conversion to sampling points and rendering. However, herein "rasterisation" will be used to refer to converting primitive data sampling point addresses only.

The rasterisation process basically maps the primitives defining the render output to be generated to the sampling points that will be used to render the output. This is typically done by determining, for each sampling point, whether the sampling point position is covered by the primitive in question or not. This determination is typically done by testing the sampling points' positions against the edges of a primitive, to see if the sampling points are covered by the primitive. To do this, graphics processors typically derive (line) equations representing each of the edges of a primitive (e.g. using the defined vertices of the primitive), and then test the sampling points' positions using these edge equations. If a sampling point "passes" the edge test, it is taken to be within the primitive.

The (line) equations representing each of the edges of a primitive are typically derived from the vertices defined for a primitive in a so-called primitive (triangle) setup operation (stage), prior to the rasterisation operation (stage). The primitive setup operation may also derive other per-primitive data for use by later graphics processing operations.

The rasterisation process is typically carried out by testing sets of one or more sampling points. For each set of one or more sampling points found to include a sampling point that is covered by the primitive in question (that is being tested), a discrete graphical entity, usually referred to as a graphics "fragment", on which the subsequent graphics processing operations (such as rendering) are to be carried out, is generated by the rasteriser and sent to the remainder of the graphics processing pipeline (such as the renderer) for processing.

One drawback of graphics processing systems is that because primitives are processed sequentially, and typically not in perfect front-to-back order, a given sampling position (and hence pixel) may be shaded multiple times as a render output is generated. This occurs when a first received and rendered primitive is later covered by a subsequently received and rendered primitive, such that the rendered first primitive is not in fact seen at the sampling position(s) and pixel(s) in question. Primitives can be overwritten many times in this manner, and this typically leads to multiple, ultimately redundant, graphics processing (rendering) operations being carried out for each render output, e.g. frame, being rendered. This phenomenon is commonly referred to as "overdraw".

Techniques have therefore been proposed to try to reduce the amount of "overdraw" (the amount of redundant processing of hidden surfaces) that is performed when processing a render output.

For example, early occlusion culling, such as early depth (Z) and/or stencil(s) testing processes, may be used to try to cull fragments that are issued by the rasteriser before they are sent for rendering.

These arrangements try to identify, e.g., fragments and/or sampling points, for a new primitive that will be occluded by already processed primitives (and therefore that do not need processing) before the fragments and/or sampling points are issued to the rendering pipeline. In these arrangements, the depth value at a sampling position of a new primitive that has been rasterised is compared to the depth value of the current primitive that has been rendered to that sampling position, to see if the new primitive is occluded at the sampling position in question or not. This can help to avoid sending fragments that are occluded by already processed primitives through the rendering pipeline.

FIG. 1 shows an exemplary graphics processing pipeline that may be executed by a graphics processor to perform graphics processing to generate a render output that can operate in the above manner.

As shown in FIG. 1, the graphics processing pipeline 1 includes a vertex loader 2 that is operable to load vertex positions for primitives to be processed by the graphics processing pipeline.

The vertices loaded by the vertex loader 2 are then used by a primitive (triangle) setup unit 3 to perform any required per-primitive computations and to derive any required per-primitive data, using the vertices for the primitive loaded by the vertex loader 2.

The so-"setup" primitives are then rasterised by the rasteriser 4 to generate corresponding fragments representing the primitive. The fragments are then subjected to an early depth and stencil test 5 to see if any of them can be identified at that stage as being occluded and so discarded.

Any fragments that pass the early depth and stencil test 5 are then rendered 6 (e.g. by executing an appropriate fragment shader program for the fragments).

The rendered fragments are then subjected to a final "late" depth and stencil test 7 before being output, e.g., to memory or directly for display (if they pass the late depth and stencil test 7).

The Applicants believe that there remains scope for improvements to the processing of graphics primitives when generating a render output in a graphics processor.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
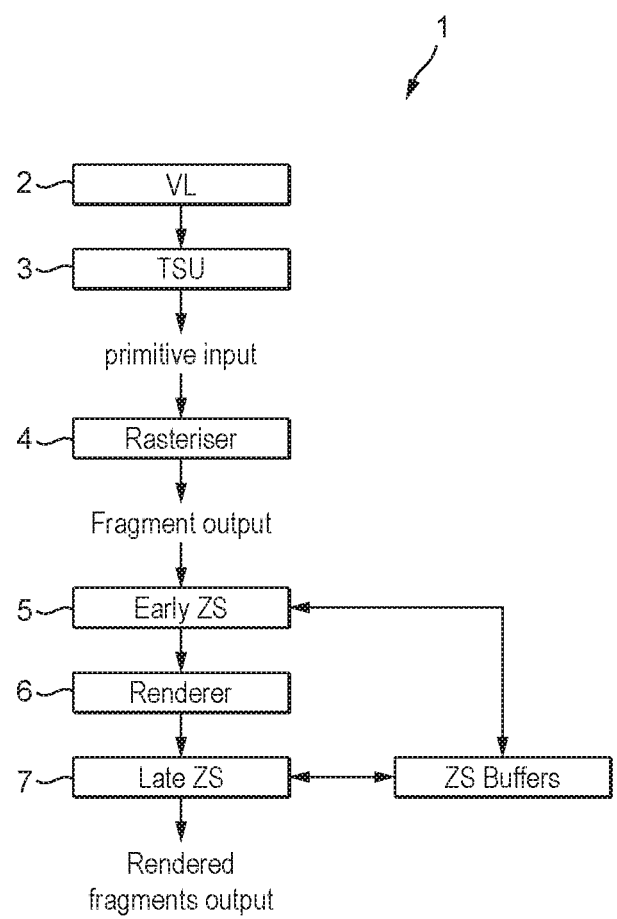
FIG. 1 shows an exemplary graphics processor.

An embodiment of the technology described herein comprises a method of processing graphics primitives when generating a render output in a graphics processor, the graphics processor executing a graphics processing pipeline that includes:

a vertex loading stage that loads vertex positions for primitives to be processed;

a primitive setup stage that determines per-primitive data for primitives to be processed from vertex positions loaded for the primitives by the vertex loader;

a rasteriser that rasterises primitives to generate graphics fragments for rendering using per-primitive data determined by the primitive setup stage; and a renderer that renders graphics fragments generated by the rasteriser to provide rendered graphics fragments for output;

the method comprising:

for a primitive to be processed when generating a render output:

the vertex loader loading the vertex positions for the primitive;

before the primitive setup stage generates per-primitive data for the primitive using the loaded vertex positions for the primitive, performing an early culling test for the primitive using data of the loaded vertex positions for the primitive; and when the primitive passes the early culling test:

the primitive setup stage determining per-primitive data for the primitive using the loaded vertex positions for the primitive; and the rasteriser rasteri sing the primitive using the per-primitive data generated by the primitive setup unit;

when the primitive fails the early culling test:

discarding the primitive from further processing at the early culling test, such that the primitive setup stage will not determine per-primitive data for the primitive and the primitive will not be rasterised by the rasteriser.

Another embodiment of the technology described herein comprises a graphics processor operable to process graphics primitives to generate a render output, the graphics processor comprising:

a vertex loader that loads vertex positions for primitives to be processed;

a primitive setup circuit that determines per-primitive data for primitives to be processed from vertex positions loaded for the primitives by the vertex loader;

a rasteriser that rasterises primitives to generate graphics fragments for rendering using per-primitive data derived by the primitive setup circuit; and a renderer that renders graphics fragments generated by the rasteriser to provide rendered graphics fragments for output;

the graphics processor further comprising:

an early culling test circuit configured to, for a primitive to be processed when generating a render output:

perform an early culling test for the primitive using data of the loaded vertex positions for the primitive before the primitive setup circuit determines per-primitive data for the primitive;

and to:

when the primitive passes the early culling test:

pass the primitive to the primitive setup circuit to determine per-primitive data for the primitive using the loaded vertex positions for the primitive; and to the rasteriser to rasterise the primitive using the per-primitive data generated by the primitive setup unit;

when the primitive fails the early culling test:

discard the primitive from further processing at the early culling test, such that the primitive setup circuit will not determine per-primitive data for the primitive and the primitive will not be rasterised by the rasteriser.

The technology described herein relates to the processing of graphics primitives when generating a render output.

In the technology described herein, the positions of vertices for graphics primitives are loaded and then used to derive per-primitive information for the primitives, with that per-primitive information then being used to rasterise the primitives.

However, in the technology described herein, a primitive is subjected to an early culling test (such as, and in an embodiment, a depth test (as will be discussed further below)) based on the loaded vertex positions for the primitive, before the per-primitive information is derived for the primitive in the primitive setup stage.

When that early culling test determines that the primitive can be discarded, then the primitive setup operation is not performed for the primitive and the primitive is not sent to the rasteriser for rasterisation.

As will be discussed further below, this then allows primitives that will not in fact contribute to the final render output to be culled from processing at an earlier stage in the primitive processing pipeline, thereby reducing the overall amount of redundant processing, etc., that may be performed when generating a render output.

The Applicants have in particular recognised in this regard, that if a primitive will in fact not need to be rasterised at all (e.g. because it is appropriately occluded by other primitives appearing in the render output), then it is not in practice necessary to perform primitive setup operations for that primitive either.

Furthermore, the Applicants have recognised that the fact that a primitive will not need to be rasterised at all can be recognised using the loaded vertex positions for the primitive prior to performing any per-primitive data generation as part of the primitive setup process. This then means that primitives can be tested prior to undergoing the primitive setup process, and potentially discarded. This will then have the effect of reducing the load on both the primitive setup stage (unit) and the rasteriser of the graphics processing pipeline.

The Applicants have further recognised that the primitive setup operation can be a significant performance bottleneck for the front end of the graphics processing pipeline in some circumstances, and so reducing the number of primitives that need to undergo primitive setup operations (and subsequently rasterisation) can reduce the amount of processing that must be performed when generating a render output relatively significantly.

The technology described herein accordingly can provide improved performance when generating a render output.

The graphics processor of the technology described herein can be any suitable and desired graphics processor. In an embodiment, the graphics processor is a tile-based graphics processor and performs tile-based rendering.

In tile-based rendering, the two-dimensional render output (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete render output (e.g. frame for display). In such arrangements, the render output is typically divided (by area) into regularly-sized and shaped rendering tiles (they are usually e.g., squares or rectangles).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The render output that is being generated in the technology described herein can be any suitable and desired render output that a graphics processor and graphics processing pipeline may be used to generate. In one embodiment the render output is a frame for display (e.g. on a screen or printer). However, the technology described herein may also be used where the render output is not intended for display, for example where the render output is a texture that the graphics processing system is being used to generate (e.g. in "render to texture" operation), or, indeed, where the output of the graphics processor is any other form of data array. In an embodiment, the render output is an image (whether for display or otherwise to be used or processed).

Correspondingly, the render output being generated may comprise, for example, a tile to be generated in a tile-based graphics processing system (pipeline) (with the process then being repeated for each tile making up the overall output being generated), and/or the entire frame (e.g. an image or a texture) of output fragment data.

The graphics processor will process at least one primitive in the manner of the technology described herein when generating a render output. Typically a render output will require the processing of a plurality of primitives, and in that case, in an embodiment plural, and in an embodiment all, of the primitives being processed to generate the render output are processed in the manner of the technology described herein.

A primitive to be processed in the technology described herein may comprise any desired and suitable polygon that can be processed for a render output, such as a triangle or quadrilateral. The primitive will be and is in an embodiment defined by and represented as a set of one or more vertices. Each vertex for a primitive may have associated with it a set of data (such as position, colour, texture and/or other attributes data) representing the vertex.

The vertex loader may be operable to load vertex positions for primitives to be processed when generating a render output in any suitable and desired manner. It in an embodiment loads (at least) the vertex positions for a (and each) primitive, in an embodiment from memory where the vertices (the data for the vertices) has been stored, e.g. by a driver for the graphics processor in response to a request for graphics processing from an application that requires the generation of the render output in question.

The primitive setup stage (circuit (unit)) derives per-primitive data for a primitive to be processed. It in an embodiment derives at least line equations representing the edge or edges of the primitive. It may also derive other per-primitive data, such as depth bounds, depth bias, and area, if desired, and/or perform a check to see if the primitive is (at least in part) within the tile being processed (in a tile-based system). The primitive setup stage can perform these per-primitive computations using the vertices (the data for the vertices) for a primitive in any suitable and desired manner. For example, the primitive setup stage (circuit) may be implemented as a micro-coded engine which executes a primitive setup program. Other arrangements would, of course, be possible.

The rasteriser can rasterise input primitives to generate graphics fragments to be processed in any suitable and desired manner. It should, and in an embodiment does, operate to generate graphics fragments for processing in dependence upon which sampling points (or which sets of sampling points) of an array of sampling points covering the area of the render output a given primitive received by the rasteriser covers (at least in part). The rasteriser should, and in an embodiment does, generate a graphics fragment for each sampling point covered by, and/or for each set of plural sampling points (sampling mask) found to include a sampling point that is covered by, the primitive being rasterised. Each fragment generated by the rasteriser may represent (have associated with it) a single sampling point or plural sampling points as desired. In an embodiment each fragment represents a set of plural, and in an embodiment four (2×2), sampling points.

In an embodiment, the rasteriser is a hierarchical rasteriser that operates to iteratively test primitives against progressively smaller patches of sampling points down to a particular, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested in an embodiment corresponds to an integer number of fragments, such as 16×16, 8×8, 4×4 and/or 2×2 fragments.

In these arrangements, the rasteriser in an embodiment starts with a large patch of the render output area and tests if the primitive in question is inside that patch. If not, the entire patch is discarded, and the next patch tested and so on. On the other hand if a primitive is found to be within the patch (to cover, at least in part, the patch), the patch is sub-divided, in an embodiment into four parts, and each "sub-patch" then tested in the same way, and so on, until a minimum patch size is reached (which in an embodiment corresponds to a 2×2 group of fragments) (but which could, e.g., be an individual sampling point, an individual fragment or a different sized group of fragments).

Where in this arrangement the smallest patch size contains plural sampling points, the rasteriser in an embodiment then tests the individual sampling points in the final patch to see if they are covered by the primitive, and then generates fragments accordingly.

The vertex loader, primitive setup stage (circuit) and rasteriser can be considered together to comprise a "fragment frontend" processing pipeline. That pipeline is in an embodiment then followed by a fragment processing pipeline that includes one or more processing stages, including, inter alfa, and in an embodiment, the renderer that processes fragments generated by the rasteriser to generate output fragment data.

The renderer (rendering circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In an embodiment, the renderer is in the form of a fragment shader (a programmable processing stage (circuit) that executes fragment shading programs to generate output fragment data for input fragments).

In an embodiment, the renderer (rendering operation) is followed by a "late" culling test (circuit), such as, and in an embodiment, a late depth and/or stencil test, that tests the rendered fragments to determine if they should replace (the data of) any fragments for the same sampling positions that have already been rendered (i.e. if they will overdraw any already rendered primitives at the sampling position or positions in question). This late culling test in an embodiment uses appropriately stored, e.g., and in an embodiment, depth data values for the sampling positions of the render output, that can then be compared with depth data values for new fragments at the sampling positions in question.

The graphics processor (processing pipeline) in an embodiment then includes an appropriate write out stage (circuit) for writing out rendered fragment data, e.g. to main memory and/or for display. The rendered fragment data may also, in the case of a tile-based graphics processor, first be written to a tile buffer or buffers in local storage of the graphics processor before then being written out from the tile buffers to the main memory (for example a frame buffer, e.g. in external memory) for use (e.g. to display the frame on a display).

In an embodiment, the graphics processor (the graphics processing pipeline) also includes a further early culling test (circuit) (in addition to the early culling test that is prior to the primitive setup operation), such as, and in an embodiment, an early depth and/or stencil test, between the rasteriser and the renderer, so as to (potentially) cull from rendering any fragments that can be determined as not contributing to the final render output prior to being rendered. This early culling test in an embodiment uses culling data, such as depth data, that is also used for the "late" culling test that occurs after the rendering operation.

The early culling test that is performed in the technology described herein for a primitive prior to the primitive set up operation may comprise any suitable such testing, such as early occlusion testing, such as depth (Z) testing and/or early stencil testing. In an embodiment it comprises an early depth (Z) test. In an embodiment it comprises both early depth and early stencil tests.

The pre-primitive setup early culling test in an embodiment operates to test the primitive for a patch (region) of the render output (area) (with the test in an embodiment being determined to be passed or failed for the patch as a whole).

Thus, in an embodiment, (at least) for the purposes of the pre-primitive setup early culling test, the render output is divided into a plurality of regions or "patches" with the pre-primitive setup early culling test then testing a region or "patch" of the render output against a (and, e.g., each) primitive to be processed to determine if the primitive passes the early culling test or not.

The regions or patches of the render output that the primitives are tested against can take any desired and suitable form. A (and each) patch in an embodiment represents a respective distinct area of the render output to be generated.

The patches of the render output that are tested in an embodiment all have the same size and shape, and are in an embodiment rectangular (and in an embodiment square).

The (and each) patch in an embodiment corresponds to a plurality of sampling positions of the render output to be generated, such as, and in an embodiment, to 64×64, 32×32, 16×16, 8×8, 4×4 and/or 2×2 sampling positions.

In an embodiment, where the rasteriser is operable to test primitives against patches of the render output for rasterisation purposes, the pre-primitive setup early culling test tests primitives (only) against the largest sized patches that the rasteriser will consider. Thus, where the rasteriser is a hierarchical rasteriser (as discussed above), the pre-primitive setup early culling test in an embodiment tests primitives (only) against the largest sized patches in the rasterisation hierarchy.

In an embodiment, when the graphics processor is a tile-based graphics processor, the patches that the pre-primitive setup early culling test tests primitives against comprise the tiles that the render output will be generated as.

Thus, in an embodiment, the graphics processor is a tile-based graphics processor and the render output being generated is a tile of an overall output frame to be displayed, and the pre-primitive setup early culling test performs an early culling test (and in an embodiment a depth test) for a primitive to be processed against the tile that is being generated as a whole, with the primitive then either being discarded from processing for the tile in question, or sent onwards for further processing (and at least for primitive setup and rasterisation) for the tile, in dependence upon whether the primitive passes the pre-primitive setup early culling test or not.

The pre-primitive setup early culling test can be carried out in any suitable and desired manner. It is in an embodiment carried out in an appropriately conservative manner.

The pre-primitive setup early culling test in an embodiment compares the value or values of a particular parameter for the primitive being tested against a value or values for that parameter for (associated with) the patch of the render output that the primitive is being tested against. Thus, in the case of an early depth test, a depth value or values for the primitive being tested will be compared to a depth value or values for the patch of the render output that the primitive is being tested against, to determine if the primitive passes the pre-primitive setup early depth test or not.

Accordingly, in an embodiment, the graphics processor is operable to and operates to store appropriate sets of early culling test parameter (data) values for respective patches of the render output, such that those parameter values are available for use by the pre-primitive setup early culling test. The parameter values that are stored should, and in an embodiment do, comprise the appropriate parameter values that the early culling test will use (i.e. will depend on upon the nature of the early culling test). Thus, in an embodiment, respective depth values and/or respective stencil values are stored for patches of the render output that the pre-primitive setup early culling test will test primitives against.

The early culling test, e.g. depth and/or stencil, patch data may be stored in any desired and suitable storage that is able to be accessed by the graphics processor. The storage may be dedicated storage for this purpose, or it may be part of storage that is used to store other data in addition to the early culling test, e.g. depth and/or stencil, data. The storage may be any desired and suitable data storage, such as, e.g., a register or registers, a buffer or buffers, a cache or caches, main memory, etc.

Thus, in an embodiment, the pre-primitive setup early culling test has an associated depth buffer that stores depth values for patches of the render output to be compared with the depth values for primitives when performing the pre-primitive setup early culling (depth) test.

The early culling test, e.g. depth, data for a (and each) patch may take any suitable and desired form, e.g., and in an embodiment, that is suitable for use for the pre-primitive setup early culling test. Thus, a range of the parameter value for a (and each) patch, and/or minimum and/or maximum parameter values for a patch, and/or a functional representation of parameter values (e.g. coefficients for a plane equation) may be stored for a (and each) patch.

Thus, in an embodiment, a maximum and/or minimum depth value, and/or a depth value range and/or a depth value function (e.g. coefficients for a plane equation) are stored for a (and each) patch.

Other arrangements would, of course, be possible.

The parameter, e.g. depth, data for the patches may be derived as desired. In an embodiment this data is generated from previously processed primitives (e.g., and in an embodiment, that have passed the pre-primitive setup early culling test).

Thus, in an embodiment, if the pre-primitive setup early culling test is passed, any data (buffer), such as a depth buffer, etc., associated with that test and/or that contains data related to that test is updated as well, e.g., and in an embodiment, with the relevant data value(s), e.g. depth value(s), associated with the primitive that has passed the culling test.

Thus, in an embodiment, the pre-primitive early culling testing stage has an associated buffer that stores data, e.g. depth, values to be compared with the data, e.g. depth, values for primitives when performing the early culling test, and the pre-primitive early culling test is configured to also (appropriately) update the data, e.g. depth, values stored in the buffer associated with the early culling test when a primitive passes the early culling test.

In an embodiment, expected culling test parameter, e.g. depth, values are generated and/or stored for respective patches of the render output in advance of rendering a set of primitives (e.g., for a tile), which parameter values the early culling test can and in an embodiment does then use when testing primitives. These expected parameter, e.g. depth, values in an embodiment represent (encompass) all the possible outcomes of the parameter value for the patch in question, and are in an embodiment updated as the rasterisation and rendering proceeds using parameter, e.g. depth values, for primitives as they pass the pre-primitive setup early culling test.

Any updating, etc., of the, e.g., depth buffer, etc., is in an embodiment carried out in an appropriately conservative fashion, so as to avoid any risk that the updates could cause errors in the processing of future primitives, etc.

The pre-primitive setup early culling test may compare a data value or values for a primitive to the corresponding data value or values for the patch of the render output that is being considered in any suitable and desired manner.

In one embodiment, the appropriate data value for each vertex of the primitive is compared to the corresponding data values for the patch to determine if the primitive passes the pre-primitive setup early culling test or not. Thus, in the case of a depth test, the depth value for each vertex of the primitive will be compared to the depth value or values stored for the patch in question. In this case, the primitive is in an embodiment determined to fail the pre-primitive setup early culling test when (and only when) the depth values for all of the vertices are greater than the maximum depth value for the patch (i.e. such that it can be concluded that all the fragments for the primitive will be behind the current (or expected) closest primitive for each sampling position of the patch).

In another embodiment, rather than simply testing the relevant early culling test data values for the vertices of the primitive, where a vertex or vertices of the primitive lie outside the patch of the render output that the pre-primitive setup early culling test is testing the primitive against (i.e. the primitive extends beyond the patch boundary), then the relevant parameter (e.g. depth) values for the primitive at the edges of the patch (i.e. where the edges of the primitive and the edges of the patch intersect) are determined (from the parameter, e.g. depth, values for the vertices of the primitive), and then those primitive parameter values at the patch edge intersections are used when performing the early culling test. This may allow the pre-primitive setup early culling test to discard more primitives than would be the case if the parameter values at the vertices of the primitive were being considered.

Where a vertex or vertices of the primitive lie outside the patch of the render output that the pre-primitive setup early culling test is testing the primitive against (i.e. the primitive extends beyond the patch boundary), then the pre-primitive setup early culling test in an embodiment also or instead (and in an embodiment also) determines the early culling test, e.g. depth, values for the primitive at the positions of any corners of the patch that lie within the primitive (again rather than simply using the depth value of a vertex of the primitive that lies outside the patch) (again this can be determined from the parameter, e.g. depth, values for the vertices of the primitive), and then those primitive depth parameter values at the patch corners are used when performing the early culling test. Again, this will provide more accurate parameter (e.g. depth) values to use for the primitive in relation to the patch being considered when performing the pre-primitive setup early culling test.

In an embodiment, the rasteriser of the graphics processor is a hierarchical rasteriser (as discussed above), and the hierarchical rasteriser is also operable to perform an early culling test in respect of patches of the render output when it is rasterising the primitives, and the early culling test (e.g. depth test) implemented by the hierarchical rasteriser and the pre-primitive setup early culling test share (use in common) the same set of early culling test data (e.g. depth buffer) for their early culling tests. Correspondingly, both the early culling test at the rasteriser and the pre-primitive setup early culling test may, and in an embodiment do, update the early culling test data (e.g. depth buffer) (as appropriate).

When the primitive being tested fails the pre-primitive setup early culling test (e.g. is found to be occluded), then that primitive is "culled" from further processing.

This culling can be achieved (and provided) in any desired and suitable manner. In an embodiment the primitive is not sent onwards through the pipeline for processing (such that it will not be subjected to primitive setup, rasterising and rendering) (in respect of the patch of the render output in question).

When the primitive being tested passes the pre-primitive setup early culling test, then the primitive is sent onwards for processing (at least to the primitive setup stage and for rasterisation). The primitive will also, if appropriate, be subjected to one or more subsequent graphics processing pipeline operations (stages) following rasterisation, as appropriate, such as, and in an embodiment, one or more of: an early fragment depth and/or stencil testing stage; a renderer (fragment shader); and a late fragment depth and/or stencil testing stage and a write out stage operable to write (shaded) fragment data to a (e.g. tile or frame) buffer.

The technology described herein is applicable to any suitable form or configuration of graphics processing system, graphics processor, and renderer, such as one having a "pipelined" arrangement.

The technology described herein accordingly extends to, and may comprise, a graphics processor including a graphics processing pipeline operable, and/or operated, in accordance with the method of any one or more of the embodiments of the technology described herein. Subject to any hardware necessary to carry out the specific functions discussed above, such a graphics processor can otherwise include any one or more or all of the usual functional units, etc., that graphics processors include.

In the case of a tile-based (tiling) graphics processor, the graphics processor may also comprise a tile buffer for storing tile sample values (rendered fragment data) and/or a write out unit that operates to write the data in the tile buffer (e.g. once the data in the tile buffer is complete) out to external (main) memory (e.g. to a frame buffer).

In embodiments, the various functions of the technology described herein may be carried out on a single graphics processing platform that generates and outputs the rendered fragment data that is, e.g., written to a frame buffer for a display device.

In some embodiments, the processor, pipeline, etc., comprises, and/or is in communication with and/or associated with, one or more buffers and/or memory devices that store the data described herein, and/or store software for performing the processes described herein. The processor, pipeline, etc., may also be in communication with a host microprocessor, and/or with a display for displaying images based on the data generated by the graphics processor.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuits, circuitry, processing logic, microprocessor arrangements, etc., that are operable to perform the various functions, etc., such as appropriately configured dedicated hardware elements or processing circuits/circuitry and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit/circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry (circuits) of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry (circuits).

It will also be appreciated that all of the described embodiments of the technology described herein can include, as appropriate, any one or more or all of the optional features described herein.

The methods in accordance with the technology described herein may be implemented at least partially using software e.g. computer programs. It will thus be seen that further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

Not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Figure 2:
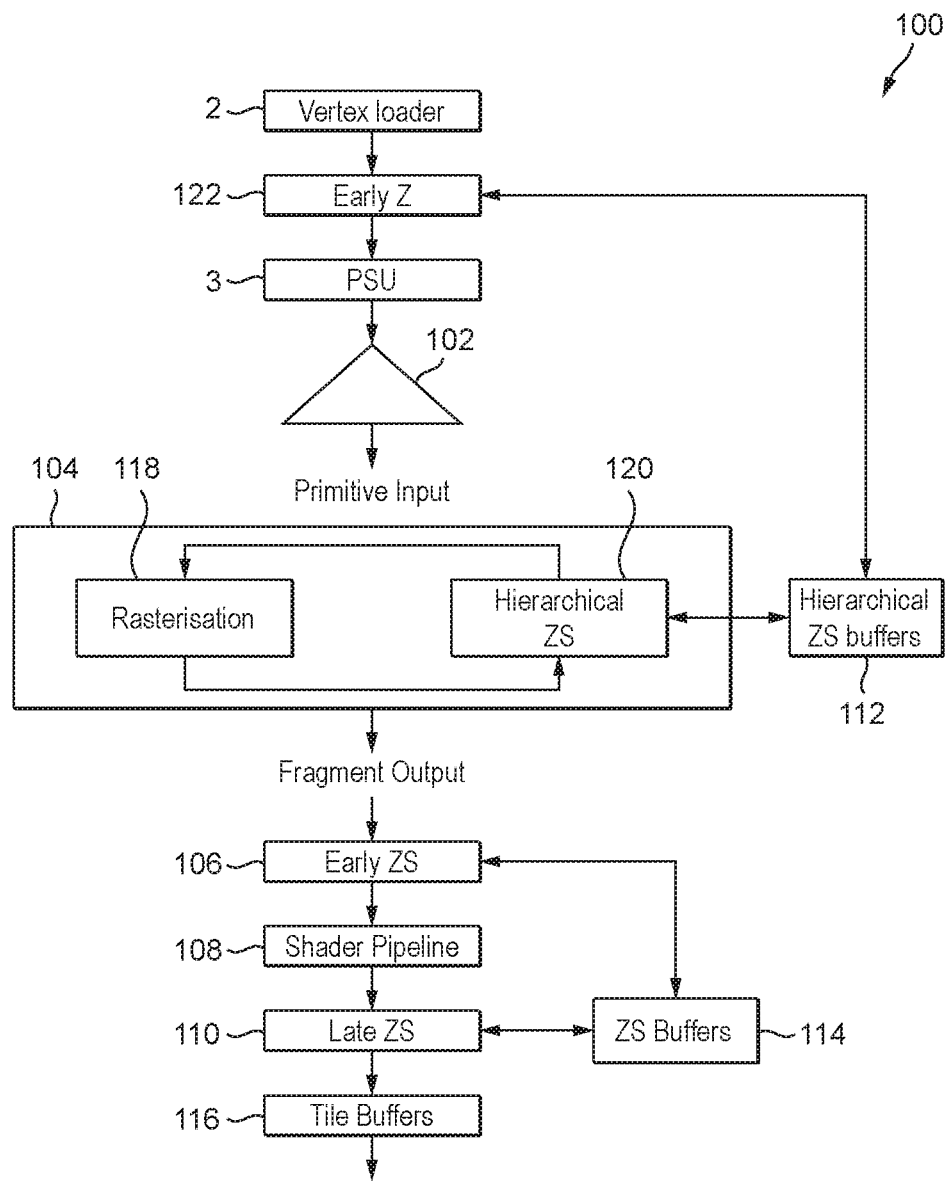
FIG. 2 shows schematically a graphics processor of an embodiment of the technology described herein.

FIG. 2 shows schematically a graphics processor 100 that implements a graphics processing pipeline that is in accordance with an embodiment of the technology described herein.

FIG. 2 shows the main elements and pipeline stages of the graphics processor 100 that are relevant to the operation of the present embodiment. As will be appreciated, there may be other elements of the graphics processor 100 that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, etc., of the graphics processor 100 as shown in FIG. 2 may be implemented as desired and will accordingly comprise, e.g., appropriate circuits, processing logic, etc., for performing the necessary operation and functions.

The graphics processor of FIG. 2 is a tile-based processor. The graphics processor 100 will thus produce tiles of a render output data array, such as an output frame to be generated. The render output data array may be an output frame intended for display on a display device, such as a screen or printer, but may also, for example, comprise a "render to texture" output of the graphics processor, etc.

As shown in FIG. 2, the graphics processor 100 includes a vertex loader 2 that is operable to load vertex positions for primitives to be processed by the graphics processor. Thus the vertex loader 2 will load the positions (x, y, z, w) for the vertices of a primitive to be processed (3 positions for a triangle, 2 positions for a line, and so on) from memory.

The vertices loaded by the vertex loader 2 are then used by a primitive (triangle) setup unit 3 to perform any required per-primitive computations and to derive any required per-primitive data, using the vertices for the primitive loaded by the vertex loader 2.

The so-"setup" primitives are then provided to the later part of the graphics processing pipeline of the graphics processor 100 for processing.

As shown in FIG. 2, the later part of the graphics processing pipeline of the graphics processor 100 includes a number of processing stages, including a rasteriser 104, an early depth and stencil (ZS) test stage 106, a rendering stage in the form of a fragment shading pipeline stage 108, and a late depth and stencil (ZS) test stage 110. The pipeline also includes and/or has access to (is in communication with) appropriate memory for storing the data that the pipeline will use and/or generate, such as initial or "hierarchical" depth and stencil (ZS) buffer(s) 112, depth and stencil (ZS) buffer(s) 114, tile buffer(s) 116, etc.

The rasteriser 104 can operate to rasterise primitives 102 making up the render output (e.g. the image to be displayed) into graphics fragments for processing. When doing this, the rasteriser 104 receives graphics primitives 102 to be rendered, and may rasterise primitives 102 to sampling points and generate graphics fragments having appropriate positions (representing appropriate sampling positions) for rendering the primitives 102.

In the present embodiment, each graphics fragment that can be generated in the graphics processing pipeline may have associated with it a single sampling point or plural (and typically four) sampling points. Other arrangements would be possible. When plural sampling points are used, each graphics fragment has associated with it a coverage bit mask indicating which sampling points of the plural sampling points that the fragment can represent, are actually being used when rendering the fragment (i.e. are actually covered by the primitive 102 in question).

In the present embodiment, the rasteriser 104 comprises a "hierarchical" rasterisation stage 118 that can iteratively test primitives 102 against progressively smaller patches (regions) of the render output (target) area (and thus, correspondingly, patches of potential fragments), down to a minimum patch size corresponding, in the present embodiment, to a 2×2 group of potential fragments (a "quad"), discarding (culling) any patches that are not at least in part covered by the primitive 102. Thus, each patch that is tested corresponds to a set of potential fragments.

To perform primitive coverage testing, the rasterisation stage 118 initially receives the new input primitive 102 and selects a larger 16 x16 fragment patch (which, in the present embodiment, corresponds to the size of an entire tile). The rasterisation stage 118 then tests the larger patch against the edges of the input primitive 102 in question to determine if that input primitive 102 at least partially covers the larger patch (e.g. at least partially covers any patch of a 2×2 set of smaller patches of the render output that the larger patch can be sub-divided into (encompasses)).

The edges of the input primitive 102 are represented by appropriate line (edge) equations that have been derived from the vertices of the input primitive 102 by the primitive setup stage 3. A grid of patch testing points is derived for the patch (and for each patch) being tested. For example, a grid comprising 2×2 patch testing points may be used, with a patch testing point being provided adjacent to (e.g. at a sampling position for a fragment located at) each corner of the patch. The patch testing points are then used with the line equations representing the edges of the input primitive 102 in question to determine if the patch is at least partially covered by the input primitive 102.

In the present embodiment, the rasterisation stage 118 determines that a patch of the render output is at least partially covered by an input primitive 102 if at least one of the following conditions is met: at least one patch testing point is within the input primitive 102; at least one edge of the patch is crossed by an edge of the input primitive 102; at least one vertex of the input primitive 102 is within the patch; or at least one vertex of the input primitive 102 is at a patch edge and, if the vertex is at the patch edge, another vertex of the primitive 102 is at another edge of the patch, or if the vertex is at a corner of the patch, another vertex is at the opposite corner or at one of the opposite edges of the patch. In this embodiment, a larger patch is considered as being at least partially covered by an input primitive 102 when at least one of the smaller patches that are encompassed by the larger patch is determined as being at least partially covered by the input primitive 102 using the above conditions.

In this embodiment, the rasterisation stage 118 also determines whether a patch of the render output is completely covered by an input primitive 102. In this embodiment, a patch can be determined as being completely covered by a primitive when the patch testing points are all found to be within the edges of the input primitive 102. In this embodiment, a larger patch is considered to be completely covered by an input primitive 102 when all of the smaller patches that are encompassed by the larger patch are determined as being completely covered by the input primitive 102 using the above condition.

If it is found that a patch is not covered by the input primitive 102 at all, then the patch is not processed further in respect of the input primitive 102 in question (i.e. the entire patch is discarded or "culled" for the input primitive 102 in question). However, another patch (tile) may later be selected and tested against the input primitive 102. Similarly, the region of the render output covered by the patch may be selected and tested as a new patch against a new input primitive.

If an input primitive 102 is found to at least partially cover a larger patch, then the larger patch is forwarded to a hierarchical depth and stencil (ZS) test stage 120 of the rasteriser 104 that can perform initial hierarchical depth and stencil tests on the patches considered by the rasteriser 104 the to see if those patches can be culled. To do this, the hierarchical ZS test stage 120 performs an initial depth (Z) test on each at least partially covered patch to see if the patch can be discarded or "culled" at this stage. At the same time, an initial stencil (S) test is carried out.

The rasteriser 104 is accordingly in communication with hierarchical ZS buffer(s) 112. The hierarchical ZS buffer(s) 112 can store depth data (such as a range of depth values and/or depth function data) and a stencil value for each patch size and position that the buffer represents (essentially for each patch size and position that the rasteriser 104 could consider for the tile that is being processed).

In the present embodiment, the hierarchical ZS test stage 120 performs a hierarchical depth test on a patch, using a depth value range representative of the primitive 102 that at least partially covers that patch, by taking appropriate depth samples for the patch in respect of the primitive, and comparing the depth samples for the patch with the depth range data already stored in the corresponding entry for that patch position, to try to determine whether that patch will be occluded by or will overdraw other fragments and sampling points to be rendered. If the patch passes the hierarchical depth test, then the depth value ranges stored in that entry of the hierarchical ZS buffer(s) 112 are updated accordingly.

The present embodiment supports four levels of sub-division (three sub-division iterations) and starts with larger patches corresponding to an entire tile (so 16×16 potential fragments), which are then (if appropriate) sub-divided into four smaller 8×8 fragment patches. Each of those 8×8 fragment patches is then (if appropriate) sub-divided into four even smaller 4×4 fragment patches. Finally, each of those 4×4 fragment patches is then (if appropriate) sub-divided into four even smaller 2×2 fragment patches. As in the present embodiment, a 2×2 fragment patch is the minimum or smallest patch size that is used, the (potential) sub-division process stops at this point.

Thus, in the present embodiment, the rasterisation stage 118 performs iterative hierarchical primitive coverage testing in respect of the input primitive 102. Thus, in this embodiment, if an input primitive 102 is found to at least partially cover a larger patch, then the larger patch is forwarded to the hierarchical ZS test stage 120 to be tested with respect to data stored in the hierarchical ZS buffer(s) 112 as discussed above.

According to the outcome of the hierarchical depth and stencil tests performed by the hierarchical ZS test stage 120, the larger patch may be discarded by the rasterisation stage 118 or sub-divided into its four smaller 8×8 patches by the rasterisation stage 118, with any surviving smaller 8×8 patches ("sub-patches") then being buffered by the rasterisation stage 118 to await further individual testing against the input primitive 102.

A smaller 8×8 patch generated by sub-division can then be selected by the rasterisation stage 118 and tested for coverage by the primitive 102. The smaller 8×8 patch can then either be discarded or passed to the hierarchical ZS test stage 120 depending on the results of a coverage test performed by the rasterisation stage 118. A smaller 8×8 patch that is passed to the hierarchical ZS test stage 120 can then either be discarded or sub-divided into a set of four even smaller 4×4 patches by rasterisation stage 118 depending on the results of the tests performed by the hierarchical ZS test stage 120, with any surviving even smaller 4×4 patches ("sub-patches") then being buffered by the rasterisation stage 118 to await further individual testing against the input primitive 102.

An even smaller 4×4 patch generated by sub-division can then be selected by the rasterisation stage 118 and tested for coverage by the primitive 102. The even smaller 4×4 patch can then either be discarded or passed to the hierarchical ZS test stage 120 depending on the results of a coverage test performed by rasterisation stage 118. An even smaller 4×4 patch that is passed to the hierarchical ZS test stage 120 can then either be discarded or sub-divided into a set of four of the smallest 2×2 patches by the rasterisation stage 118 depending on the results of the tests performed by the hierarchical ZS test stage 120, with any surviving even smaller 2×2 patches ("sub-patches") then being buffered by the rasterisation stage 118 to await further individual testing against the input primitive 102.

A smallest 2×2 patch generated by sub-division may then be selected by the rasterisation stage 118 and tested for coverage by the primitive 102. The individual sampling points of that patch that are covered by the primitive 102 are then used to generate fragments for rendering that correspond to, and indicate, the sampling points found to be covered by the primitive 102 (four fragments would be generated if all four of the 2×2 fragments in the minimum size patch are at least partially covered by the primitive 102).

However, in other embodiments, the process of iterative hierarchical sub-division may be skipped for a large patch that is completely covered by the primitive 102 (such as primitive 102b in respect of tile 200) and that completely passes the hierarchical depth and stencil tests. In this case, the rasterisation stage 118 may directly generate and output a set of fragments corresponding to the entire large patch without subdividing or further sample testing that larger patch.

The rasterisation stage 118 can also associate with each generated fragment a coverage mask in the form of a bitmap that indicates, for each sampling point of the sampling point pattern used to generate the fragment, whether the corresponding sampling point is covered (i.e., in effect, whether the fragment is being used to render that sampling point (i.e. whether its data should be stored for that sampling point)).

Other arrangements would be possible. For example, other embodiments are contemplated in which a non-hierarchical rasteriser is used. In these embodiments, the rasteriser may still perform primitive coverage testing and initial depth and/or stencil testing in respect of a region (e.g. tile) of the render output as discussed above, but without the capability to iteratively subdivide the region for further testing.

Fragments issued (output) by the rasteriser 104 are then subject to an early depth and stencil test in the early ZS testing stage 106. This early ZS testing stage 106 performs depth and stencil tests on the individual (covered) sampling positions associated with the fragments issued by the rasteriser 104 (i.e. at per sampling point resolution).

To do this, the early ZS testing stage 106 uses per-sampling position depth and stencil values stored in the ZS buffers 114. Thus, the ZS buffers 114 store an appropriate depth (Z) value and stencil (S) value, respectively, for each sampling point that the buffer represents (essentially for each sampling point position of the tile that is being processed). These values are stored in the ZS buffers 114 when sampling points being tested by early ZS testing stage 106 and the late ZS testing stage 110 pass the respective depth and stencil tests (the stencil values can be stored/updated when the tests are failed as well).

The early ZS testing stage 106 is configured to operate in an appropriately conservative manner. Fragments that fail the early ZS testing stage 106 are culled by the early ZS testing stage 106. Fragments that pass the early ZS testing stage 106 (i.e. fragments having at least one associated covered sampling position that passes the early ZS testing stage 106) are then sent onwards to the fragment shading stage 108 (the renderer).

The fragment shading stage 108 then performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 108 is in the form of a shader pipeline (a programmable fragment shader), but other arrangements, such as the use also or instead of fixed function fragment shading units would be possible, if desired.

The late fragment depth and stencil (ZS) test stage 110 then (if it is to be performed, e.g. where early depth and stencil testing for a fragment has not taken place before shading) carries out, inter alfa, the end of pipeline depth test on the shaded fragments (on the covered sampling points associated with shaded fragments) to determine whether the sampling points that a rendered fragment represents will overdraw the fragments whose values are currently stored in the ZS buffers 114 (i.e. determines whether the fragment data for the fragments issuing from the fragment shading stage 108 should be stored in the tile buffers 116 (should replace or modify the fragment data in the tile buffer(s) of the fragments that have already been rendered)).

To do this, the late ZS test stage 110 compares the depth values of (associated with) the fragments issued from the fragment shading stage 108 with the (per-sampling position) depth values stored in the ZS buffers 114 for the sampling points in question. The depth values for sampling points that pass the late depth test are also written appropriately to the ZS buffer 114 to update it.

This late ZS test stage 110 also carries out any necessary "late" alpha and/or stencil tests on the fragments. Alternatively, any necessary "late" alpha and/or stencil tests may be performed by the fragment shading stage 108.

Fragments that fail the late ZS test stage 110 are culled by the late ZS test stage 110. The fragments that pass the late fragment ZS test are then subjected to any remaining operations necessary on the fragments, such as blending with the framebuffer, dither etc. (not shown).

Finally, the output fragment data is written to appropriate tile buffers 116 that store, an appropriate, e.g. colour, value for each sampling point that the buffers represent (in essence for each sampling position of the tile that is being processed).

Once each tile has been processed, its data is, e.g., exported from the tile buffers 116 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would be possible.

As shown in FIG. 2, in the present embodiments, the graphics processor 100 further includes, in accordance with the technology described herein, an early depth testing stage 122 prior to the primitive setup stage (unit) 3.

This pre-primitive setup early depth testing stage 122 depth tests primitives to be processed against the largest patches that the rasteriser 104 considers (and thus against the tile that is currently being generated), using, as shown in FIG. 2, the hierarchical patch depth data in the hierarchical ZS buffer 112 that the rasteriser 104 uses for its hierarchical ZS tests.

This then means that the pre-primitive setup hierarchical depth test 122 can identify any primitives that will be discarded by the rasteriser in their entirety for the tile (for the largest patch that the rasteriser will consider), and cull those primitives before they are processed by the primitive setup unit 3 and sent to the rasteriser 104. This will accordingly reduce the amount of processing that is performed in respect of primitives that would be entirely rejected by the rasteriser for a tile in any event.

The pre-primitive setup early depth test 122 compares depth values for a primitive against the corresponding depth data stored for the tile (patch) in question in the hierarchical ZS buffer 112.

This test could, for example, compare the depth value for each vertex of the primitive (which will have been loaded by the vertex loader 2) to the depth values (e.g. the maximum depth value) for the tile being tested against, to determine if all the vertices would be occluded (such that the rasteriser would discard the primitive for the tile).

Figure 3:
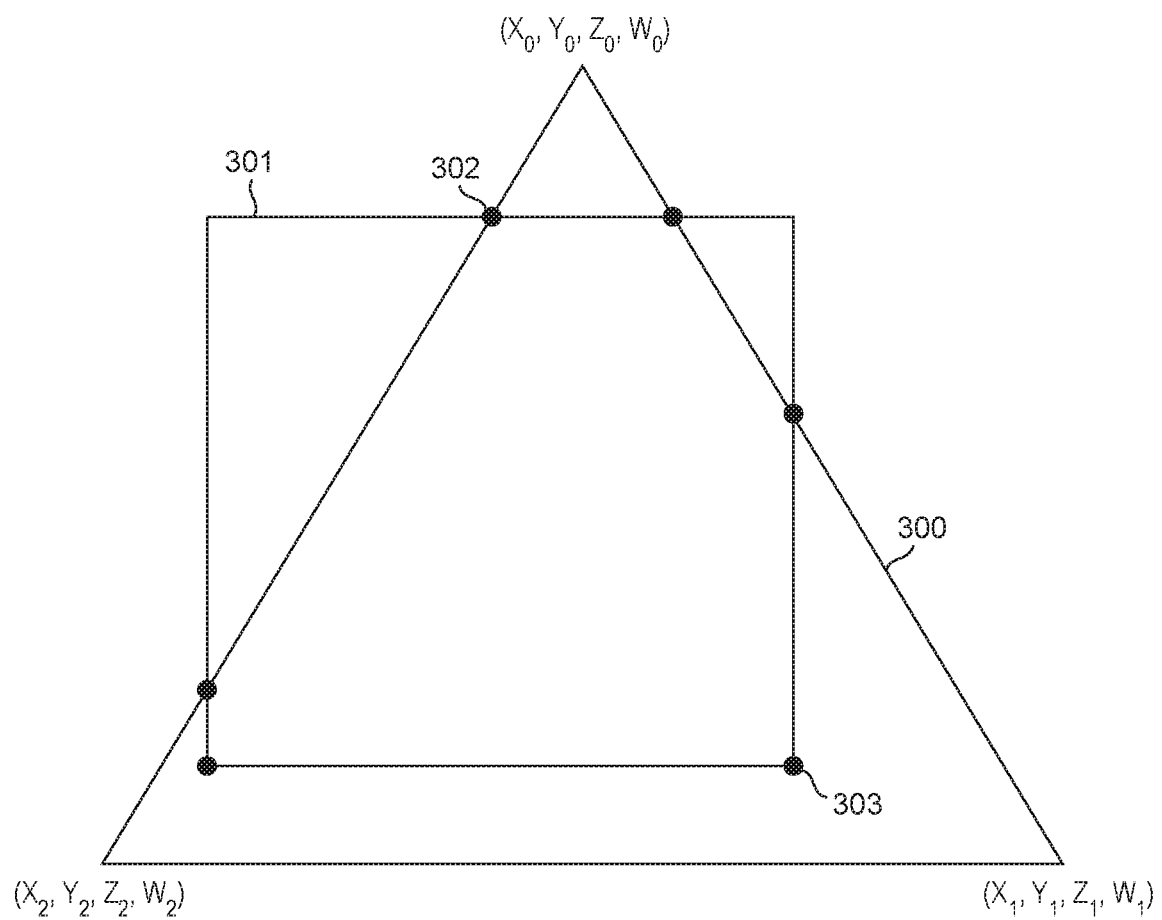
FIG. 3 illustrates the pre-primitive setup early culling test in an embodiment of the technology described herein.

Alternatively, as illustrated in FIG. 3, where a primitive 300 extends beyond the edges of the tile 301 being considered, rather than simply testing the depth values for the vertices of the primitive, depth values for the primitive could be determined (using the vertex depth values) at the tile (patch) boundaries 302 (i.e. at the intersections of the primitive with the tile boundaries), and at any covered corners 303 of the tile (patch) being tested, with those "snapped" primitive depth values then being used for the pre-primitive setup early depth test 112.

If the primitive is determined to fail the pre-primitive setup early depth test 112, then the primitive is discarded from processing for the tile in question. On the other hand, if the primitive passes the pre-primitive setup early depth test 112, then it proceeds to the primitive setup unit 3 where the pre-primitive computations are performed. The primitive is then passed to the rasteriser 104 for further processing in the normal manner.

It can be seen from the above that the technology described herein, in its embodiments at least, can provide more efficient processing of primitives when generating a render output. This is achieved, in the embodiments of the technology described herein at least, by performing an early culling test on primitives prior to the primitive setup process, to determine if primitives can be culled at that stage.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of processing graphics primitives when generating a render output in a graphics processor, the graphics processor executing a graphics processing pipeline that includes:
   a vertex loading stage that loads vertex positions for primitives to be processed;
   a primitive setup stage that determines per-primitive data for primitives to be processed from vertex positions loaded for the primitives by the vertex loader;
   a rasteriser that rasterises primitives to generate graphics fragments for rendering using per-primitive data determined by the primitive setup stage; and
   a renderer that renders graphics fragments generated by the rasteriser to provide rendered graphics fragments for output;
   the method comprising:
   for a primitive to be processed when generating a render output:
      the vertex loader loading the vertex positions for the primitive;
      before the primitive setup stage generates per-primitive data for the primitive using the loaded vertex positions for the primitive, performing an early culling test for the primitive using data of the loaded vertex positions for the primitive; and
      when the primitive passes the early culling test:
         the primitive setup stage determining per-primitive data for the primitive using the loaded vertex positions for the primitive; and
         the rasteriser rasterising the primitive using the per-primitive data generated by the primitive setup unit;
      when the primitive fails the early culling test:
         discarding the primitive from further processing at the early culling test, such that the primitive setup stage will not determine per-primitive data for the primitive and the primitive will not be rasterised by the rasteriser;
   wherein the early culling test comprises an early depth test:
   wherein the early culling test tests the primitive for a patch of the render output area, with the primitive being determined to pass or fail the test for the patch as a whole; and
   wherein the rasteriser is a hierarchical rasteriser that operates to iteratively test primitives against progressively smaller patches of the render output area, and the early culling test tests primitives against the largest sized patches in the rasterisation hierarchy.

2. The method of claim 1, wherein the graphics processor is a tile-based graphics processor, and the early culling test tests the primitive for a tile of the render output, with the primitive being determined to pass or fail the test for the tile as a whole.

3. The method of claim 1, wherein:
   the early culling test compares the value or values of a particular parameter for the primitive being tested against a value or values for that parameter for a patch of the render output area that the primitive is being tested against;
   and the method further comprises:
   storing early culling test parameter values for patches of the render output area for use for the early culling test.

4. The method of claim 3, further comprising:
   updating the stored early culling test parameter values for a patch of the render output area for use for the early culling test when a primitive passes the early culling test for that patch of the render output area.

5. The method of claim 1, wherein the early culling test compares a data value for each vertex of the primitive to a corresponding data value or values for a patch of the render output area.

6. The method of claim 1, wherein the early culling test compares a data value for the primitive at the point where an edge of the primitive and an edge of a patch of the render output area intersect, and/or a data value for the primitive at the position of a corner of a patch of the render output area that lies within the primitive, to a corresponding data value or values for the patch of the render output area.

7. The method of claim 1, wherein:
   the rasteriser of the graphics processor is a hierarchical rasteriser, and the hierarchical rasteriser is operable to perform an early culling test in respect of patches of the render output area when it is rasterising primitives; and
   the early culling test implemented by the hierarchical rasteriser and the pre-primitive setup early culling test use the same set of stored early culling test data for patches of the render output area for their early culling tests.

8. A graphics processor operable to process graphics primitives to generate a render output, the graphics processor comprising:
   a vertex loader that loads vertex positions for primitives to be processed;
   a primitive setup circuit that determines per-primitive data for primitives to be processed from vertex positions loaded for the primitives by the vertex loader;
   a rasteriser that rasterises primitives to generate graphics fragments for rendering using per-primitive data derived by the primitive setup circuit; and
   a renderer that renders graphics fragments generated by the rasteriser to provide rendered graphics fragments for output;
   the graphics processor further comprising:
   an early culling test circuit configured to, for a primitive to be processed when generating a render output:

perform an early culling test for the primitive using data of the loaded vertex positions for the primitive before the primitive setup circuit determines per-primitive data for the primitive;

and to:

when the primitive passes the early culling test:
pass the primitive to the primitive setup circuit to determine per-primitive data for the primitive using the loaded vertex positions for the primitive; and
to the rasteriser to rasterise the primitive using the per-primitive data generated by the primitive setup unit;

when the primitive fails the early culling test:
discard the primitive from further processing at the early culling test, such that the primitive setup circuit will not determine per-primitive data for the primitive and the primitive will not be rasterised by the rasteriser;

wherein the early culling test comprises an early depth test;

wherein the early culling test tests the primitive for a patch of the render output area, with the primitive being determined to pass or fail the test for the patch as a whole; and wherein the rasteriser is a hierarchical rasteriser that operates to iteratively test primitives against progressively smaller patches of the render output area, and the early culling test tests primitives against the largest sized patches in the rasterisation hierarchy.

9. The graphics processor of claim 8 wherein:
the early culling test circuit compares the value or values of a particular parameter for a primitive being tested against a value or values for that parameter for a patch of a render output area that the primitive is being tested against;

and the graphics processor further comprises:
a buffer configured to store early culling test parameter values for patches of a render output area for use by the early culling test circuit.

10. The graphics processor of claim 9, wherein the early culling test circuit is configured to:
update stored early culling test parameter values for a patch of a render output area for use by the early culling test circuit when a primitive passes the early culling test for a patch of a render output area.

11. The graphics processor of claim 8, wherein the early culling test circuit compares a data value for each vertex of a primitive to a corresponding data value or values for a patch of a render output area.

12. The graphics processor of claim 8, wherein the early culling test circuit compares a data value for a primitive at the point where an edge of the primitive and an edge of a patch of a render output area intersect, and/or a data value for a primitive at the position of a corner of a patch of a render output area that lies within the primitive, to a corresponding data value or values for a patch of a render output area.

13. The graphics processor of claim 8, wherein:
the rasteriser of the graphics processor is a hierarchical rasteriser, and the hierarchical rasteriser is operable to perform an early culling test in respect of patches of a render output area when it is rasterising primitives; and
the early culling test implemented by the hierarchical rasteriser and the pre-primitive setup early culling test circuit use the same set of stored early culling test data for patches of a render output area for their early culling tests.

14. A non-transitory computer readable storage medium comprising computer software code which when executing on a data processor performs a method of processing graphics primitives when generating a render output in a graphics processor, the graphics processor executing a graphics processing pipeline that includes:
a vertex loading stage that loads vertex positions for primitives to be processed;
a primitive setup stage that determines per-primitive data for primitives to be processed from vertex positions loaded for the primitives by the vertex loader;
a rasteriser that rasterises primitives to generate graphics fragments for rendering using per-primitive data determined by the primitive setup stage; and
a renderer that renders graphics fragments generated by the rasteriser to provide rendered graphics fragments for output;

the method comprising:
for a primitive to be processed when generating a render output:
the vertex loader loading the vertex positions for the primitive;
before the primitive setup stage generates per-primitive data for the primitive using the loaded vertex positions for the primitive, performing an early culling test for the primitive using data of the loaded vertex positions for the primitive; and
when the primitive passes the early culling test:
the primitive setup stage determining per-primitive data for the primitive using the loaded vertex positions for the primitive; and
the rasteriser rasterising the primitive using the per-primitive data generated by the primitive setup unit;
when the primitive fails the early culling test:
discarding the primitive from further processing at the early culling test, such that the primitive setup stage will not determine per-primitive data for the primitive and the primitive will not be rasterised by the rasteriser;
wherein the early culling test comprises an early depth test;
wherein the early culling test tests the primitive for a patch of the render output area, with the primitive being determined to pass or fail the test for the patch as a whole; and
wherein the rasteriser is a hierarchical rasteriser that operates to iteratively test primitives against progressively smaller patches of the render output area, and the early culling test tests primitives against the largest sized patches in the rasterisation hierarchy.

* * * * *